S. M. ANTHONY.
MAULS.

No. 174,932. Patented March 21, 1876.

Witnesses.
M. P. Utley.
B. N. West.

S. Mason Anthony
Inventor.
By Warren C. Stone
Attorney.

UNITED STATES PATENT OFFICE.

S. MASON ANTHONY, OF GLOVERSVILLE, NEW YORK, ASSIGNOR TO WILLIAM B. GREEN AND ALVIN H. LANGFIELD, OF SAME PLACE.

IMPROVEMENT IN MAULS.

Specification forming part of Letters Patent No. 174,932, dated March 21, 1876; application filed February 23, 1876.

*To all whom it may concern:*

Be it known that I, S. MASON ANTHONY, of Gloversville, in the county of Fulton and State of New York, have invented certain new and useful Improvements in Mauls; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The object of my invention is to construct a maul that will be simple, durable, and strong; to facilitate the easy and convenient replacement of a new for an old head-piece, and particularly to so secure the disks, hereinafter described, that they will not shuck or move about upon the spindle.

With this in view, my invention consists in forming the head-piece of a series of disks of prepared paper, sole-leather, rawhide, vulcanized, or any other suitable material possessing hardness, toughness, and compactness, and which is not liable to fracture, crack or cleave off, of suitable size and shape, with a central hole cut in them and placed upon a hollow metal spindle, constructed with a flange or collar at one end, which forms the base or outside retaining-plate. On the top of the disks is placed a clamp-plate formed with a central hole, which fits on the end of the spindle, and which is clamped to the outside flange or collar, with the disks between it and the outside retaining-plate, by screw-bolts passing down through the clamp-plate and the disks, about midway between the circumference of the central hole through which the spindle passes and the periphery of the disks, and screw into female screw-threads formed in the outside flange or collar, thus securing the disks from shucking or moving upon the spindle.

Figure 1:
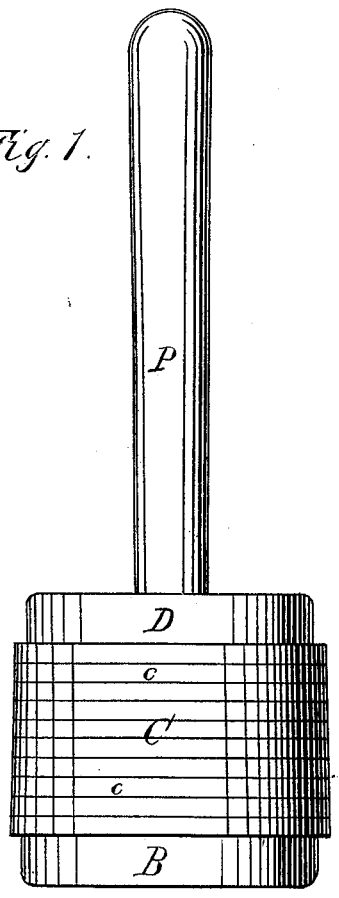
Figure 2:
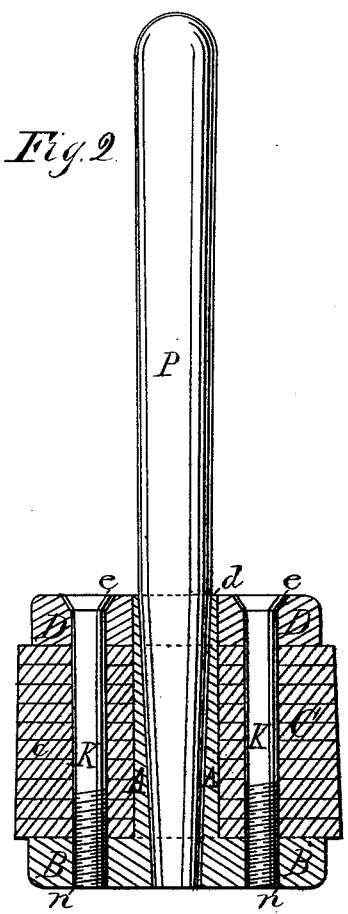

In the drawings, Figure 1 is a side elevation, and Fig. 2 a central longitudinal section, of my invention.

A is the hollow spindle constructed with the flange or collar B. C represents the head-piece composed of the disks $c\ c$ placed upon the hollow spindle A. D is the clamp-plate, constructed with a central hole, $d$, for the hollow spindle A, and holes $e\ e$ for the reception of the screw-bolts K K. The disks $c\ c$ have corresponding holes formed in them through which the screw-bolts K K pass and enter the female screw-threads $n\ n$ in the flange of the collar B, thus clamping the disks together and retaining them from shucking or moving upon the spindle. P is the handle passing through the hollow spindle A, and is secured by any suitable and convenient means.

It is evident that when it is desired to remove the old and worn disks and supply their place with new ones it may be accomplished by simply removing the screw-bolts.

I am aware that mallets have been constructed having a metal sleeve or tube, having a length adapted to the reception of only the disks and the metal collars or clamp-plates, such tube also having at its outer end one of the collars cast upon it, the corresponding collar or clamp-plate placed at the other end of the tube provided with a nut at its outer side, turning on a screw-thread cut on the tube operated so as to inclose and compress said disks, but such I do not claim as my invention.

I do claim, however, as my invention, and desire to secure by Letters Patent—

The combination, in a maul, of the hollow spindle and the clamp-plate, secured together by screw-bolts, whereby the disks are firmly held against shucking or moving upon the spindle, substantially as described.

In testimony that I claim the foregoing as my own I affix my signature in presence of two witnesses.

S. M. ANTHONY.

Witnesses:
CHAS. LYKE,
E. BARTON WHITNEY.